Nov. 29, 1938.　　W. H. D. BROUSE　　2,138,781
LIQUID DISPENSING APPARATUS
Filed June 8, 1937　　5 Sheets-Sheet 4
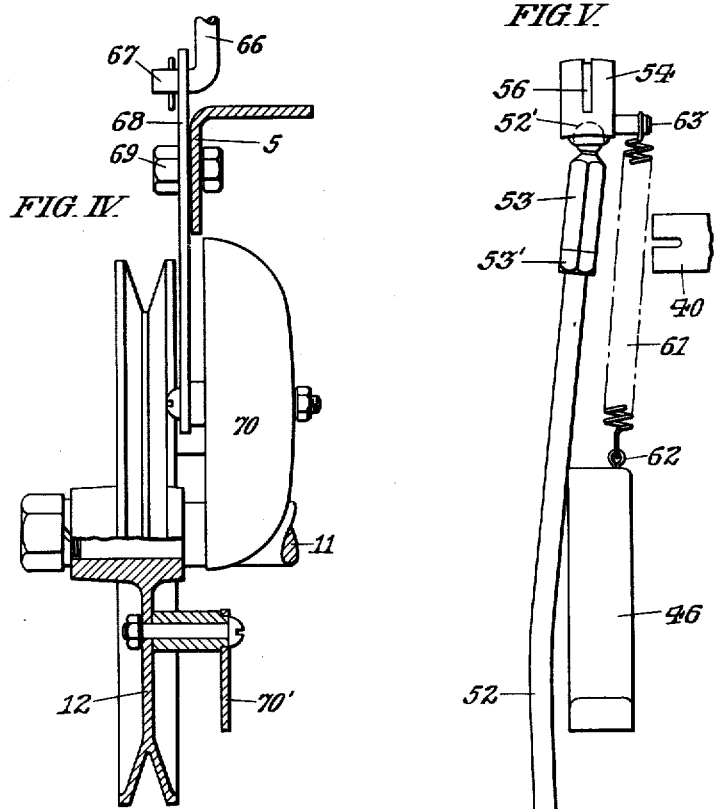
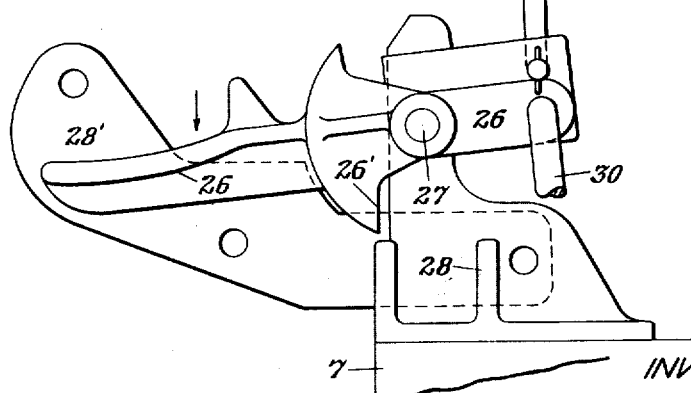
INVENTOR:
WILLIAM H. D. BROUSE

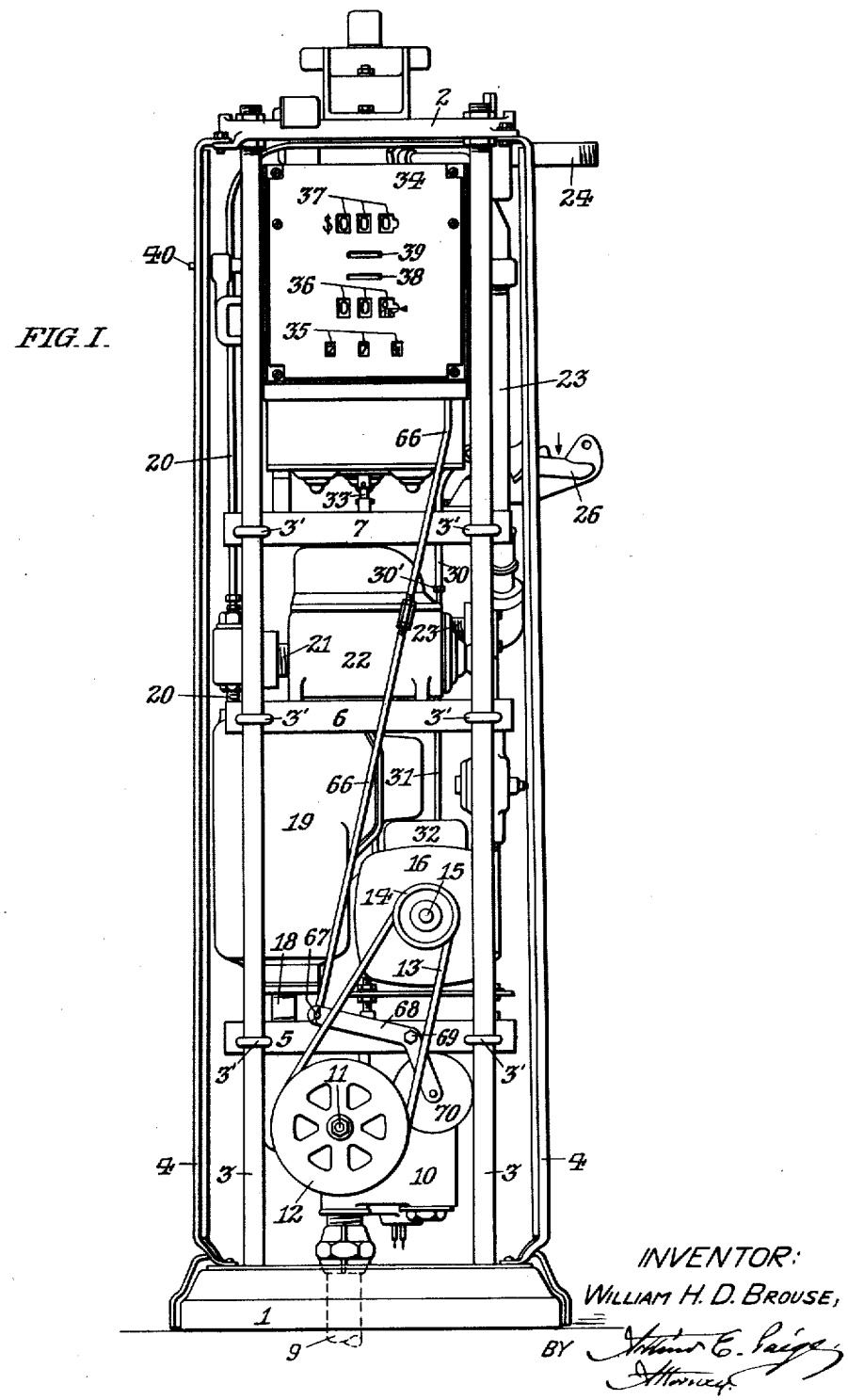

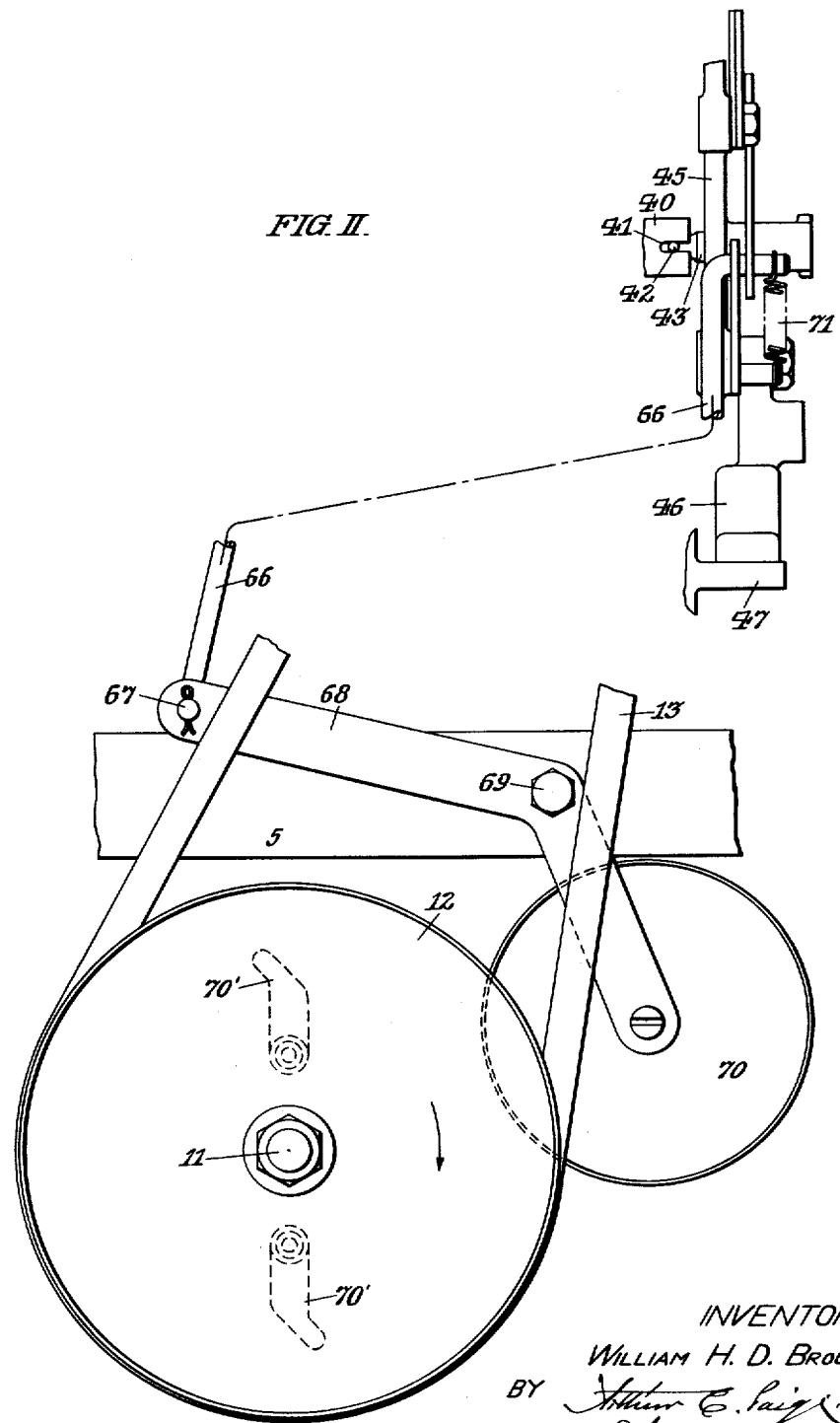

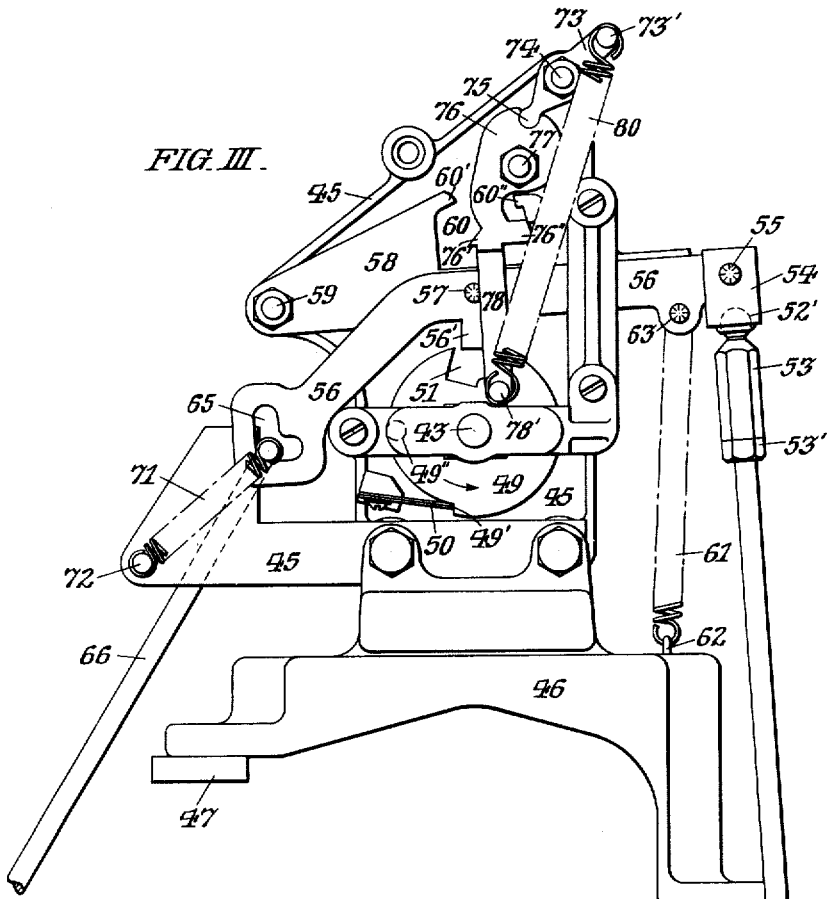
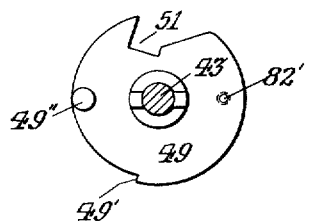
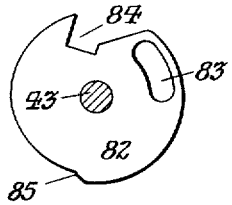
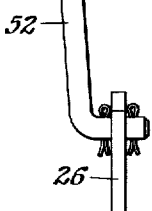

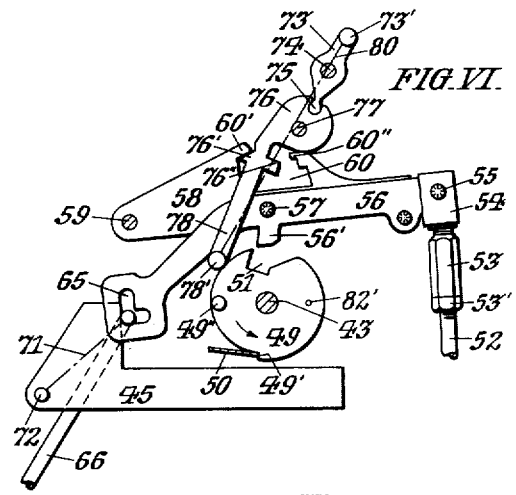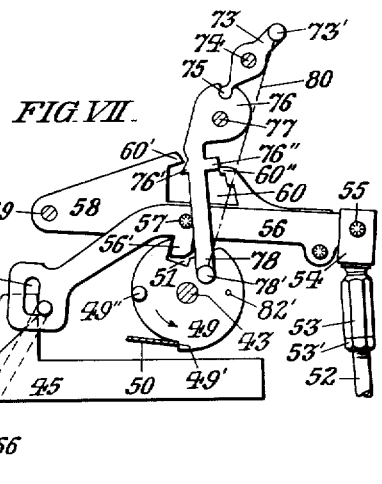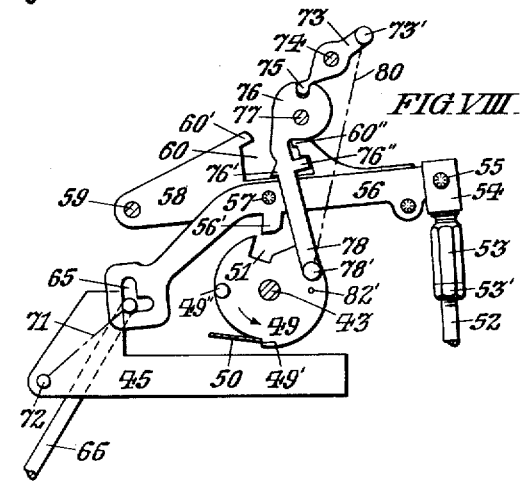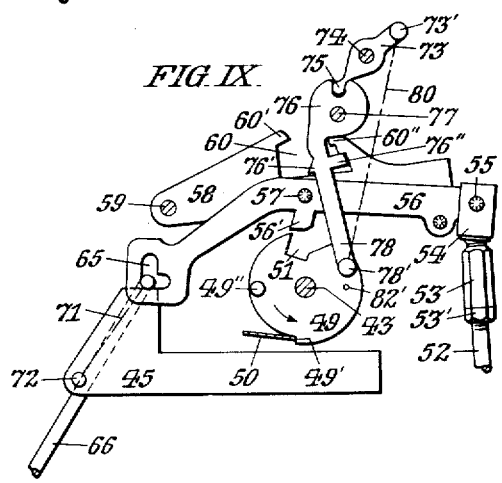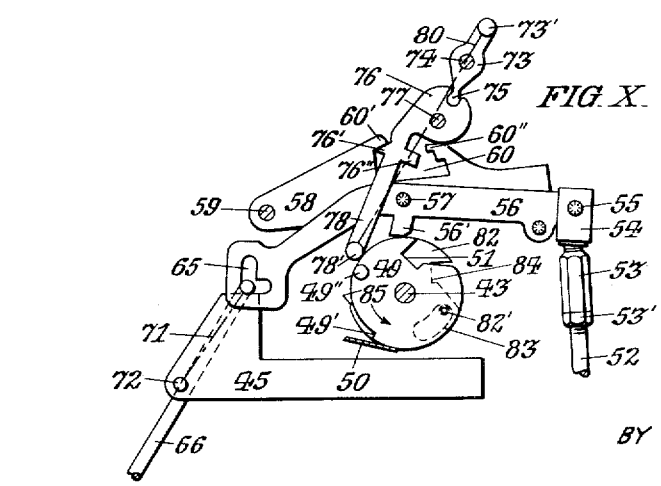

Patented Nov. 29, 1938

2,138,781

UNITED STATES PATENT OFFICE 2,138,781

LIQUID DISPENSING APPARATUS

William H. D. Brouse, Toronto, Ontario, Canada, assignor to John Wood Manufacturing Company, Inc., Conshohocken, Pa., a corporation of Delaware Application June 8, 1937, Serial No. 146,988

9 Claims. (Cl. 221—95)

My invention is particularly applicable to metering pumps for dispensing gasoline. Such apparatus includes a meter through which the liquid is forced by a pump from a supply tank to and through a dispensing hose. Said pump is actuated by an electric motor which is energized and de-energized by manual operation of an electric switch by the operator, and said meter is operatively connected with an indicator, for manifesting by numerals the quantity of liquid dispensed in gallons and fractions of a gallon. Of course, in order to insure dispensation of a given quantity at any operation, it is necessary that the indicator be at its zero position at the beginning of each dispensing operation. It is ordinary practice to provide such a metering pump with automatically operative locking means for positively preventing the initiation of any dispensing operation until the indicator is placed in its zero position. However, such mechanism is complicated and correspondingly costly. Therefore, it is the purpose and effect of my invention to provide an audible alarm signaling device which will being to sound and continue to sound upon manual closure of the meter switch to initiate any dispensing operation when the indicator is not at its zero position. The purpose of such an alarm signal is to notify not only the operator of the apparatus, but any prospective customer that the apparatus is not in condition to dispense liquid without cheating the customer as to the quantity dispensed. Such apparatus is preferably provided with a notice to the customer as to the meaning of the alarm. For instance, "Alarm rings continuously if indicator is not re-set to zero." Upon the sounding of the alarm, the operator may only stop it by resetting the indicator to its zero position.

My invention includes the various novel features of construction, arrangement, and method of operation hereinafter more definitely specified.

In said drawings: Fig. I is a front elevation of a metering pump of what is known as the "curbstand type" for dispensing gasoline and including a convenient embodiment of my invention. Fig. II is a fragmentary elevation of said apparatus corresponding with Fig. I, but on a larger scale. Fig. III is a fragmentary elevation of a portion of the apparatus as seen from the right hand side of Fig. I, but on the same scale as Fig. II; showing the mechanism for controlling the alarm signal. Fig. IV is a fragmentary sectional view, partly in elevation, as seen from the right hand side of Fig. II. Fig. V is a fragmentary elevation of the hose supporting lever and parts connected therewith as seen from the rear of Fig. I but on the same scale as Fig. II. Figs. VI to X inclusive show respectively different and successive positions of a part of the mechanism shown in Fig. III, but on a smaller scale. Figs. XI and XII are elevations, respectively of the driven cam shown in Figs. VI to X inclusive, and of the follower cam which is located behind it.

As hereinafter described; said signal controlling mechanism is operatively connected with the electric switch by which the motor for pumping the liquid to be dispensed is actuated, and Fig. VI shows the position of the signal controlling device corresponding with the off position of the switch and with the indicator at zero. Fig. VII corresponds with the on position of said switch, during the dispensing operation. Fig. VIII corresponds with the off position of the switch after a dispensing operation but before the indicator is reset to zero position. Fig. IX corresponds with the on position of the switch when the indicator has not been reset and consequently the alarm bell is ringing. Fig. X corresponds with conditions similar to Fig. IX, but with the indicator nearer its zero position but with the bell still ringing.

Referring to Fig. I; the liquid dispensing apparatus is mounted in the housing which is adapted to be fixed upon a pavement or platform at a curb or driveway and includes the cast metal base member 1 and top member 2 which are substantially rectangular and connected at their corners by four cylindrical standards 3, and four channel bars 4 which will serve to support a thin sheet metal casing which is omitted from the drawings but which includes four substantially flat panels extending vertically upon the four sides of the housing. Said frame standards 3 are also cross-connected by transverse frame members 5, 6, and 7, rigidly connected therewith by U-bolts 3'.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the shaft 15 of the electric motor 16, which is supported by said transverse frame member 5. The liquid is discharged from said pump 10 through the conduit 18 into the receptacle 19 in which air and vapor entrained in the liquid is eliminated from the liquid and discharged through the outlet conduit 20 which extends to the top of the frame, from which the eliminated fluid is discharged. The liquid passes from said casing 19 through the conduit 21 to the meter 22 from which it is discharged through the conduits 23 and 24. The conduit 24 is connected with a flexible dispensing hose having the usual valve controlled nozzle at its discharge end.

The hook lever 26, which, as shown in Fig. V is fulcrumed at 27 on the bracket 28, rigidly connected with said transverse frame member 7, is provided to support the hose nozzle in idle position, the outer end of said lever 26 being then depressed by the weight of the hose and nozzle to an extent limited by the stop lug 26' on said lever which then contacts with the left hand edge of the bracket 28 shown in Fig. V. The arm 28' of said bracket 28 serves as a rigid support for the weight of said hose and nozzle when said lever 26 is depressed as above described.

The inner end of said lever 26 is pivotally connected with the vertically reciprocatory link 30 which is adjustably connected, by the coupling 30' shown in Fig. I, with the rod 31 for operating the electric switch in the box 32 indicated in said figure.

As shown in Fig. I; the shaft 33 which is turned by the mechanism of the meter 22 drives computing registering mechanism including series of decimally numbered wheels comprising indicating mechanism covered by the face plate 34. Said face plate 34 has windows 35 for displaying numerals representing the price of gasoline. The numerals displayed in said figure indicate the price of gasoline to be twenty-seven and one-half cents per gallon. Said indicator has windows 36 for displaying numerals representing the quantity of gasoline dispensed but, as the indicator is in zero position that fact is indicated by the ciphers displayed. Said indicator has windows 37 for displaying numerals representing the value of the liquid dispensed at a single dispensing operation but, as the indicator is in zero position that fact is manifested by the ciphers shown in said windows. Said indicator has the single window 38 for display of numerals of a total adder representing the total quantity of liquid which has been dispensed and has the single window 39 for display of numerals of a total adder of the value of all of the liquid which has been dispensed. In the form of my invention shown the indicator is provided with manually movable shutters which are normally closed so that the totals indicated by the adders behind the windows 38 and 39 are not visible.

The shaft 40 projecting at the left hand side of Fig. I may be engaged by any suitable key in the custody of the operator for resetting the indicating mechanism to the zero position shown, by rotation of said shaft 40 clockwise as seen from the left hand side of Fig. I. As shown in Fig. II said shaft 40 is provided with a slot 41 at its right hand end for engagement with the cross pin 42 on the alarm signal control shaft 43 so that said shaft 43 is continually connected therewith so as to be turned by said reset shaft 40.

As shown in Fig. III; said shaft 43 is journaled in the bearing plate 45 rigidly connected with the bracket 46 supported by rigid connection with the frame members 47 and 48. Said shaft 43 carries at the right hand end thereof with respect to Fig. I, which is the front end shown in Fig. III, the cam disk 49 having the shoulder 49' which as shown in Fig. III is normally engaged by the stop spring 50 to prevent said reset shaft 40 and signal controlling shaft 43 from being turned in the reverse direction. Said cam 49 has the recess 51 for cooperation with a compound lever device hereinafter described.

Referring to Fig. V, the inner end of said hook lever 26 is also pivotally connected with the link 52, which, as shown in Figs. III and V, has at the upper end thereof, the ball 52' carried by the coupling 53 adjustably secured by the nut 53' on said link 52. Said ball 52' is seated in the socket 54 which is connected by the pivot 55 with the signal controlling lever 56 which is fulcrumed at 57 upon the lever 58 which is fulcrumed at 59 upon said bearing plate 45. As shown in Fig. III, said lever 56 has the projection 56' for cooperation with the recess 51 in said cam disk 49, as shown in Fig. VII. As shown in Fig. III, said lever 58 has the recess 60 in the upper edge thereof with opposite detent projections 60' and 60''. As shown in Figs. III and V; said lever 56 is continually stressed downwardly at its right hand end by the spring 61 which extends from the anchor eye 62 on said bracket 46 to the stud 63 on said lever 56.

As shown in Fig. III, the left hand end of said signal controlling lever 56 has the angle slot 65 therein through which extends the outwardly bent horizontal upper end of the link rod 66 which, as shown in Fig. I, has its lower end connected by the pivot 67 with the lever 68 which is fulcrumed at 69 on the transverse frame member 5 and carries at its lower end the bell 70. Said link 66 is continually stressed downwardly by the spring 71 shown in Fig. III, which extends from the upper end of said link 66 to the anchor stud 72 on said frame 45. Said spring 71 not only continually stresses said link 66 downwardly to thus lift the bell 70 away from the axis of the shaft 11 and grooved pulley 12 to prevent it from being sounded when said spring is free to thus operate; but also continually stresses downward the left hand end of said signal controlling lever 56 to the position shown in Fig. III, when said lever 56 is not upheld by the toggle device which, as shown in Fig. III, includes the lever 73 fulcrumed at 74 on said bearing plate 45 and pivotally connected at its end 75 with the lever 76 which is fulcrumed at 77 on said bearing plate 45. Said toggle lever 76 has oppositely extending detent projections 76' and 76'' for respective cooperation with the detent projections 60' and 60'' on said lever 58, and has its arm 78 provided with the stud 78' at its lower end. Said stud 78' is connected by the tension spring 80 with the stud 73' on said lever 73 so that said spring 80 alternately snaps said toggle levers from left to right with respect to the fulcrum 77 of the lever 76. In Fig. VI said spring has snapped said toggle levers to the left, after lever 78 has been pushed past dead center by stud 49'' on cam 49. In Fig. VII it has snapped said toggle levers to the right, after lever 78 has been pushed back by projection 60', and in Figs. VIII and IX it maintains said toggle levers in their right hand deflected position, but in Fig. X it snaps them back to the left hand position. The successive positions of said toggle levers shown in Figs. VI to X inclusive are attained by the cooperation therewith of said spring 80 and the compound levers 56 and 58 and the cam disk 49.

The position of said signal controlling mechanism shown in Fig. VI corresponds with that indicated in Fig. I; viz., the hook lever 26 being depressed by the weight of the hose and nozzle hung thereon, the motor switch 32 is open, the motor idle, and the indicator 34 at zero position. The position of said controlling mechanism shown in Fig. VII is that assumed when the weight of the hose and nozzle is uplifted from said hook lever 26 and the latter manually uplifted to the position shown in Fig. V and in that position liquid is being dispensed by operation of the pump 10 by the motor 16. The position of the signal controlling mechanism shown in Fig. VIII is that assumed when the motor switch is closed by hanging the dispensing hose and nozzle on the hook lever 26, but the indicator has not been reset by turning the resetting shaft 40 clockwise as above described.

With the indicator not reset at zero position, if the motor switch be turned on through manual uplifting of the hook lever 26, which hook lever upward movement simultaneously effects downward movement of link 52, the lever 56 only, and not both levers 56 and 58, is pulled downwardly by the spring 61, and through such tilting of the lever 56, the slotted end 65 thereof uplifts the link rod 66 to the position shown in Fig. IX, swings the bell carrying lever 68 into the operative position shown in Fig. IV, and the signal controlling mechanism assumes the position shown in Fig. IX.

In that position said bell 70 is pushed down from its idle, inoperative, position shown in Figs. I and II to the position in which its rim is presented in the path of rotation of the bell strikers 70' which, as shown in Fig. IV, are rigidly connected with said grooved pulley 12 and in position to strike the rim of said bell. The bell continues to ring even when the resetting shaft 40 is turned clockwise in Fig. I and counterclockwise as indicated by the arrow in Fig. X nearly to the zero position indicated in Fig. VI because, as shown in Fig. X, the projection 56' on the lever 56 rides on the surface of the cam disk 49 as soon as the shaft 40 and its connected shaft 43 have been turned far enough to lift said projection out of the recess 51 to the perimeter of said cam disk. Said lever 56 is thus upheld by the cam disk 49, as shown in Fig. X, until said disk 49 is turned to the zero position in which the spring 50 snaps over the shoulder 49' and the projection 56' is left suspended by the lever 56 as shown in Fig. VI, in which position the indicator is at zero.

I find it desirable to turn said shaft 40 a single revolution, plus forty-five degrees, to effect the zeroizing operation aforesaid. Such movement turns the cam 49 forty-five degrees counterclockwise beyond the position in which it is shown in Figs. VI to IX inclusive, but, when it is released, spring means in the computing registering mechanism behind said face plate 34, turns said cam 49 by its shaft 43, back to the position shown in Figs. VI to IX inclusive, where it is stopped by the spring 50 with all of the dials at zero position. In order to insure that the projection 56' shall not drop into the notch 51 until the registering mechanism is reset at the zero position; I mount loosely on said shaft 43, behind the cam 49, driven by said shaft 43, the follower cam 82, shown in Fig. XII. Said follower cam 82 has the arcuate slot 83 therein, into which the pin 82' projects from said cam 49 in which it is fixed. The effect of that arrangement is that when said shaft 43 and cam 49 are turned counterclockwise to effect the resetting zeroizing operation above described, said cam 82, which has a notch 84 which is normally registered in alinement with the notch 51 in the cam 49 in all the positions shown in Figs. VI to IX inclusive, lags behind the cam 49 in the counterclockwise movement of the latter, to the extent permitted by said slot 83; to wit, forty-five degrees, the cams holding the projection 56' and lever 56 raised.

The counterclockwise movement is continued until the notch 84 in the cam 82 is brought into position to receive the projection 56', and it is held in this position by the engagement of one side of the spring 50 in the notch 85 in said cam 82, the edge of said notch 85 being beveled to cause a snap action of the spring 50 into the notch 85 in the event of any variation of travel in the resetting device. Upon release of the setback shaft, said shaft is automatically rotated in a clockwise direction and moves the cam 49 until its notch 49' is engaged by the spring 50, in which position the recess 51, of the cam 49, is in registry with the recess 84, of the cam 82, and the projection 56' may drop thereinto when the motor switch is closed.

It may be observed that the essential feature of my invention is that the shaft by which indicating mechanism is set back to zero position after a dispensing operation is operatively connected with a cam so that the latter is turned by said shaft during such resetting operation, and said cam is in cooperative relation with a lever linkage, extending to a lever for supporting the dispensing hose and nozzle in idle position and with an electric switch for controlling a motor by which liquid is dispensed and with an automatic signaling device, for the purpose and effect of sounding said signal upon any attempt to operate said motor when the indicating device has not been initially placed in its zero position, to thus insure that the customer shall not be cheated by beginning a dispensing operation with the indicator indicating that a quantity of gasoline has been dispensed.

Therefore, I do not desire to limit myself to the precise details of construction, arrangement, or method of operation herein set forth, as it is obvious that various modifications may be made therein without departing from the essential features of my invention, as defined in the appended claims.

I claim:

1. In liquid dispensing apparatus; the combination with a pump, of an electric motor operatively connected with said pump; an electric switch for controlling said motor; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft; a hook lever arranged to be depressed by the weight of a conduit through which the fluid is dispensed, when said conduit is hung on said lever in idle position; a rotary member arranged to be actuated by said electric motor and having means for operating an audible signal; an audible signaling device movable to and from operative relation with said rotary member; and a lever linkage including a signal controlling lever and means cooperatively connecting it with said electric switch, cam, hook lever, and audible signaling device; whereby, if a dispensing operation is terminated by opening said switch, by depressing said hook lever, closure of said switch before said indicator is reset to its zero position causes said audible signal to sound continually until said indicator is reset to zero position.

2. In liquid dispensing apparatus; the combination with a rotary pump; of an electric motor operatively connected with said pump; an electric switch for controlling said motor; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft, in coaxial relation therewith; a hook lever arranged to be depressed by the weight of a conduit through which the fluid is dispensed, when said conduit is hung on said lever in idle position; a spring stressing said hook lever to uplift it; a member arranged to be rotated with said pump and having means for operating an audible signal; an audible signaling device movable to and from operative relation with said rotary member; and a lever linkage including a signal controlling lever and means cooperatively connecting it with said electric switch, cam, hook lever, and audible signaling device; whereby, if a dispensing operation is terminated by opening said switch, by depressing said hook lever, closure of said switch before said indicator is reset to its zero position causes said audible signal to sound continually until said indicator is reset to zero position.

3. In liquid dispensing apparatus; the combination with a rotary pump; of an electric switch for controlling said pump; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft; a hook lever arranged to be depressed; a spring stressing said hook lever to uplift it; a rotary member arranged to be rotated with said pump and having means for operating an audible signal; an audible signaling device movable to and from operative relation with said rotary member; and a lever linkage including a signal controlling lever and means cooperatively connecting it with said electric switch, cam, hook lever, and audible signaling device; whereby, if a dispensing operation is terminated by opening said switch, by depressing said hook lever, closure of said switch before said indicator is reset to its zero position causes said audible signal to sound continually until said indicator is reset to zero position.

4. In liquid dispensing apparatus; the combination with a rotary pump; of an electric switch for controlling said pump; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft; a hook lever arranged to be depressed; a spring stressing said hook lever to uplift it; a rotary member arranged to be rotated with said pump and having means for striking a bell; a bell movable to and from operative relation with said rotary member; and a lever linkage including a signal controlling lever and means cooperatively connecting it with said electric switch, cam, hook lever, and bell; whereby, if a dispensing operation is terminated by opening said switch, by depressing said hook lever, closure of said switch before said indicator is reset to its zero position causes said signal bell to sound continually until said indicator is reset to zero position.

5. In liquid dispensing apparatus; the combination with a rotary pump; of an electric switch for controlling said pump; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft; a hook lever arranged to be depressed; a spring stressing said hook lever to uplift it; a rotary member arranged to be rotated with said pump and having means for operating an audible signal; an audible signaling device movable to and from operative relation with said rotary member; and a lever linkage including a signal controlling lever, a detent lever carrying the fulcrum of said controlling lever, a pair of toggle levers, a snap spring connecting said toggle levers, and means cooperatively connecting said linkage with said electric switch, cam, hook lever, and audible signaling device; whereby, if a dispensing operation is terminated by opening said switch, by depressing said hook lever, closure of said switch before said indicator is reset to its zero position causes said audible signal to sound continually until said indicator is reset to zero position.

6. In liquid dispensing apparatus; the combination with a rotary pump; of an electric switch for controlling said pump; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam connected to be turned by said set-back shaft; a hook lever arranged to be depressed; a spring stressing said hook lever to uplift it; a rotary member arranged to be rotated with said pump and having means for operation an audible signal; an audible signaling device movable to and from operative relation with said rotary member; and a lever linkage including a signal controlling lever, detent means, a toggle lever, a spring, and means cooperatively connecting said linkage with said electric switch, cam, hook lever, and audible signaling device; whereby, if a dispensing operation is terminated by opening said switch, by depressing said hook lever, closure of said switch before said indicator is reset to its zero position causes said audible signal to sound continually until said indicator is reset to zero position.

7. In liquid dispensing apparatus; the combination with a rotary pump; of an electric switch for controlling said pump; an indicator for manifesting the quantity of liquid dispensed by operation of said pump and including an element connected for advancement from zero position in accordance with the quantity of liquid dispensed; means for setting said indicator back to zero position after a dispensing operation, including a rotary shaft; a cam having a stop shoulder and connected to be turned by said set-back shaft; means, cooperative with said shoulder, for preventing said set-back shaft from being set forward; a hook lever arranged to be depressed; a spring stressing said hook lever to uplift it; a rotary member arranged to be rotated with said pump and having means for operating an audible signal; an audible signaling device movable to and from operative relation with said rotary member; and a lever linkage including a signal controlling lever and means cooperatively connecting it with said electric switch, cam, hook lever, and audible signaling device; whereby, if a dispensing operation is terminated by opening said switch, closure of said switch before said indicator is reset to its zero position causes said audible signal to sound continually until said indicator is reset to zero position.

8. Apparatus as in claim 7; wherein the cam driven by the set-back shaft has a notch in its perimeter; and the signal controlling lever has a detent projection, for engagement in said notch, by relative movement of said cam and controlling lever, in one position of rotation of said cam.

9. Apparatus as in claim 7; wherein the cam driven by the set-back shaft has a notch in its perimeter; and the signal controlling lever has a detent projection, for engagement in said cam notch, by relative movement of said cam and controlling lever, in one position of rotation of said cam; and a follower cam is loosely journaled on the shaft of said driven cam, has a notch similar to the driven cam, and an arcuate slot; and said driven cam has a pin projecting into said slot in the follower cam; whereby rotary movement of said driven cam by said set-back shaft effects rotary movement of said follower cam, but to such less extent that the notch in said driven cam is, temporarily, partly bridged by the perimeter of said follower cam, and accidental entrance of said lever projection into said notches, and consequent inadvertent termination of the operation of said signaling device, thereby prevented.

WILLIAM H. D. BROUSE.

CERTIFICATE OF CORRECTION.

Patent No. 2,138,781.     November 29, 1938.

WILLIAM H. D. BROUSE.

It is hereby certified that error appears in the printed specification of the above numbered patent requiring correction as follows: Page 1, first column, line 24, for the word "being" read begin; page 4, second column, line 49, claim 6, for "operation" read operating; and that the said Letters Patent should be read with this correction therein that the same may conform to the record of the case in the Patent Office.

Signed and sealed this 24th day of January, A. D. 1939.

Henry Van Arsdale (Seal)     Acting Commissioner of Patents.

ward; a hook lever arranged to be depressed; a spring stressing said hook lever to uplift it; a rotary member arranged to be rotated with said pump and having means for operating an audible signal; an audible signaling device movable to and from operative relation with said rotary member; and a lever linkage including a signal controlling lever and means cooperatively connecting it with said electric switch, cam, hook lever, and audible signaling device; whereby, if a dispensing operation is terminated by opening said switch, closure of said switch before said indicator is reset to its zero position causes said audible signal to sound continually until said indicator is reset to zero position.

8. Apparatus as in claim 7; wherein the cam driven by the set-back shaft has a notch in its perimeter; and the signal controlling lever has a detent projection, for engagement in said notch, by relative movement of said cam and controlling lever, in one position of rotation of said cam.

9. Apparatus as in claim 7; wherein the cam driven by the set-back shaft has a notch in its perimeter; and the signal controlling lever has a detent projection, for engagement in said cam notch, by relative movement of said cam and controlling lever, in one position of rotation of said cam; and a follower cam is loosely journaled on the shaft of said driven cam, has a notch similar to the driven cam, and an arcuate slot; and said driven cam has a pin projecting into said slot in the follower cam; whereby rotary movement of said driven cam by said set-back shaft effects rotary movement of said follower cam, but to such less extent that the notch in said driven cam is, temporarily, partly bridged by the perimeter of said follower cam, and accidental entrance of said lever projection into said notches, and consequent inadvertent termination of the operation of said signaling device, thereby prevented.

WILLIAM H. D. BROUSE.

CERTIFICATE OF CORRECTION.

Patent No. 2,138,781.                                    November 29, 1938.

WILLIAM H. D. BROUSE.

It is hereby certified that error appears in the printed specification of the above numbered patent requiring correction as follows: Page 1, first column, line 24, for the word "being" read begin; page 4, second column, line 49, claim 6, for "operation" read operating; and that the said Letters Patent should be read with this correction therein that the same may conform to the record of the case in the Patent Office.

Signed and sealed this 24th day of January, A. D. 1939.

Henry Van Arsdale (Seal)                                    Acting Commissioner of Patents.